US007684383B1

(12) United States Patent  
Thompson et al.

(10) Patent No.: US 7,684,383 B1  
(45) Date of Patent: Mar. 23, 2010

(54) METHOD AND SYSTEM FOR DYNAMIC CALL TYPE DETECTION FOR CIRCUIT AND PACKET SWITCHED NETWORKS

(75) Inventors: Leland Otis Thompson, Carpentersville, IL (US); Michael G. Nicholas, Wheeling, IL (US); Tejal S. Patel, Schaumburg, IL (US)

(73) Assignee: 3Com Corporation, Marlborough, MA (US)

( * ) Notice: Subject to any disclaimer, the term of this patent is extended or adjusted under 35 U.S.C. 154(b) by 2123 days.

(21) Appl. No.: 10/356,704

(22) Filed: Jan. 30, 2003

Related U.S. Application Data

(60) Provisional application No. 60/353,108, filed on Jan. 30, 2002.

(51) Int. Cl.  
*H04L 12/66* (2006.01)

(52) U.S. Cl. .................. 370/352; 370/402; 375/319; 379/74; 379/84; 379/242; 455/401; 709/227

(58) Field of Classification Search ......... 370/352–357, 370/401, 402; 379/93.26, 93.09, 74, 84, 379/242; 375/319; 455/401; 709/227  
See application file for complete search history.

(56) References Cited

U.S. PATENT DOCUMENTS

| | | | | | |
|---|---|---|---|---|---|
| 4,623,761 | A | * | 11/1986 | Winter et al. | 379/84 |
| 4,625,307 | A | * | 11/1986 | Tulpule et al. | 370/402 |
| 4,821,292 | A | * | 4/1989 | Childress | 375/319 |
| 5,572,585 | A | * | 11/1996 | Tsutsui | 379/242 |
| 5,633,917 | A | * | 5/1997 | Rogers | 379/74 |
| 5,854,830 | A | * | 12/1998 | Kenmochi | 379/100.15 |
| 6,064,653 | A | * | 5/2000 | Farris | 370/237 |
| 6,075,847 | A | * | 6/2000 | Leung | 379/100.17 |
| 6,192,231 | B1 | * | 2/2001 | Chapman et al. | 455/401 |
| 6,259,691 | B1 | * | 7/2001 | Naudus | 370/352 |
| 6,363,065 | B1 | * | 3/2002 | Thornton et al. | 370/352 |
| 6,400,709 | B1 | * | 6/2002 | Yousseff | 370/352 |
| 6,421,375 | B1 | * | 7/2002 | Chu et al. | 375/222 |
| 6,487,196 | B1 | * | 11/2002 | Verthein et al. | 370/352 |
| 6,549,946 | B1 | * | 4/2003 | Fisher et al. | 709/227 |

(Continued)

OTHER PUBLICATIONS

Internet Engineering Task Force (IETF), Requests For Comments (RFC) 2833, "RTP: Payload For DTMF Digits, Telephony Tones and Telephony Signals", May 2000.

*Primary Examiner*—Gerald Gauthier  
(74) *Attorney, Agent, or Firm*—McDonnell Boehnen Hulbert & Berghoff LLP (57) ABSTRACT

A method and system for dynamic call type detection for circuit and packet-switched networks. A network endpoint, such as a gateway, will receive an incoming signal and make an examination of the signal to detect characteristics of the signal. Upon detection of a characteristic of the signal, the gateway will generate a data packet, identifying the characteristic, and send the packet to a receiving network endpoint. The initial gateway will continue to examine the incoming signal and continue to send packets identifying characteristics of the signal as more characteristics are detected. The receiving gateway may then begin reproducing the signal in part by generating a signal that has the characteristics as indicated by the data packets. Once the initial gateway no longer receives the incoming signal, and determines that an event has occurred, the gateway will send a packet to the receiving gateway to inform it of the event.

27 Claims, 8 Drawing Sheets

U.S. PATENT DOCUMENTS

| | | | |
|---|---|---|---|
| 6,757,367 B1* | 6/2004 | Nicol | 379/90.01 |
| 6,965,600 B2* | 11/2005 | George | 370/392 |
| 7,035,293 B2* | 4/2006 | Branden | 370/526 |
| 7,038,800 B2* | 5/2006 | Ono et al. | 358/426.04 |
| 7,046,382 B1* | 5/2006 | Chu | 358/1.15 |
| 7,126,711 B2* | 10/2006 | Fruth | 358/1.15 |
| 7,161,931 B1* | 1/2007 | Li et al. | 370/352 |
| 7,359,370 B1* | 4/2008 | Renkel et al. | 370/352 |
| 2002/0131415 A1* | 9/2002 | Guven et al. | 370/394 |
| 2002/0168056 A1* | 11/2002 | Binal | 379/93.09 |
| 2003/0123466 A1* | 7/2003 | Somekh et al. | 370/401 |
| 2006/0203982 A1* | 9/2006 | Robertson et al. | 379/93.09 |
| 2006/0227764 A1* | 10/2006 | Miriyala et al. | 370/352 |
| 2007/0053371 A1* | 3/2007 | Jin | 370/401 |

* cited by examiner

METHOD AND SYSTEM FOR DYNAMIC CALL TYPE DETECTION FOR CIRCUIT AND PACKET SWITCHED NETWORKS

PRIORITY

The present patent application claims priority under 35 U.S.C. §119(e) to U.S. Provisional Patent Application Ser. No. 60/353,108; filed on Jan. 30, 2002, the full disclosure of which is incorporated herein by reference.

FIELD OF INVENTION

The present invention relates to network communications, and more particularly, to network signal detection and network event communication.

BACKGROUND

Telephone companies provide telephony service to their customers using systems known generically as either circuit or packet switched systems. Circuit switched systems send data signals continuously over telephone lines to provide both Internet access and conventional analog telephony or simply plain old telephone service ("POTS"). Packet switched systems, such as the Internet, serve as a transport medium for carrying voice and data in a data packet form. One of the main differences between these technologies is that the circuit switched systems have a continuous circuit whereas packet switched systems transmit bursts of packets and are therefore discontinuous.

Currently, there is a growing trend to transition from use of circuit switched networks to packet switched networks. For example, the voice over Internet protocol (VoIP), is becoming a popular method for making a telephone call over a packet switched network. The International Telecommunications Union (ITU) standard H.323 is a current standard for transmitting voice over the Internet. Session Initiation Protocol ("SIP") is another popular protocol. In these networks, voice may be compressed by standard means such as G.723.1 or G.729.A and used for transmitting compressed speech.

Unfortunately, however, signaling within a packet switched network can have more stringent constraints than within a circuit switched network to limit bandwidth consumption. In one instance, when modems communicate through a packet network, the modems exchange control signals during the communication. The packet switched network endpoint that communicates with a given modem will receive the control signal and send it through another endpoint that then communicates the signal to the other modem. However, the packet network endpoint may have to wait long periods of time to detect or identify certain signals received from the modem. For example during modem answer sequences, typical standards recommend and/or require waiting a specified amount of time to detect certain signals before proceeding to the next sequence (e.g., an answer tone (like "ANS") detection is typically detected for 1 second by a modem before a training sequence can begin). Also, some signals are sufficiently complex and require significant amounts of time to simply generate all the information contained in the signal (e.g., an $\overline{\text{ANSam}}$ signal includes a 180 degree phase reversal every 450 ms). Other transmission standards as set forth in RFC 2833, the full disclosure of which is herein incorporated by reference, also impose limitations for communicating signals within and between the network endpoints.

Additionally, during the time that a packet network endpoint waits to identify the signal, vocoders in the endpoint may destroy the incoming signal. Care should be taken to ensure that the FAX or Voice Band Data terminations at the circuit-switched endpoints can function properly even with these known limitations of packet networks. For example, when transmitting these signals inband, over a lossy network with a lossy compressed codec, signal information is destroyed. This should be minimized or avoided altogether during the answer phase and training phase of a voice band modem or FAX transmission. The packet network should not cause the modulating endpoint to misidentify the signal sent from another modulating endpoint.

SUMMARY

Communication over the Internet Protocol ("IP") network may support VoIP as well as Modem over IP ("MoIP") and Fax over IP ("FoIP") protocols. The IP network may send any type of voice signal, tone signal, or data by dynamically detecting and converting the signals or data into a digital message for transmission over the communication network. In an exemplary embodiment, a system automatically detects the type of call in order to transmit any type of data signals, line signals or modulated data protocols such as fax and modem protocols. For example, the data or line signals may be dual tone multi-frequency ("DTMF"), an answer tone ("ANS"), ANSam, line, trunk signals, and general multi-frequency tones commonly used in modems and fax machines. The $\overline{\text{ANSam}}$ signal, for instance, is defined as a 2100 Hz sine wave, amplitude modulated at 15 Hz with 180 degree phase reversals at intervals of 450 +/−25 ms.

In one respect, the exemplary embodiment may take the form of a method of communicating signals between a first and a second communication network endpoint, e.g., gateways, through a communication network. The method includes receiving an incoming signal at the first communication endpoint and examining the incoming signal to detect at least one partial characteristic of the incoming signal. The at least one partial characteristic itself is insufficient to fully define the incoming signal according to predefined signal types. The method further includes, upon detection of the at least one partial characteristic of the incoming signal, generating and transmitting a message that identifies the at least one partial characteristic of the incoming signal. The method also includes further examining the incoming signal to detect additional partial characteristics.

In another respect, the exemplary embodiment may take the form of a method of communicating an event between a first and a second communication network endpoint through a communication network. The event comprises a set of predetermined characteristics. The method includes receiving a signal at the first communication endpoint and detecting a subset of the predetermined characteristics within the signal. The method also includes generating a message that identifies the subset of the predetermined characteristics and sending the message from the first communication network endpoint. The method further includes determining that the signal includes the set of predetermined characteristics, generating an event message that includes information indicative of the event, and sending the event message from the first communication network endpoint.

In still another respect, the exemplary embodiment may take the form of a gateway. The gateway includes a signal detector that is able to receive a signal and to detect at least one partial characteristic of the signal. The at least one partial characteristic itself is insufficient to fully define the signal according to predefined signal types. The signal detector is further able to determine if the signal includes a set of predetermined characteristics that is indicative of an event. The gateway also includes a tone encoder coupled to the signal detector and being operable to receive the at least one partial characteristic, to generate a first message that identifies the at least one partial characteristic of the signal, and to generate subsequent messages in response to the signal detector detecting additional partial characteristics of the signal. The subsequent messages at least include the at least one partial characteristic and the additional partial characteristics of the signal. The gateway further includes an event encoder coupled to the signal detector and being operable to generate an event message in response to the signal detector determining that the signal is indicative of the event.

In yet another respect, the exemplary embodiment may take the form of a system. The system includes a communication network and a first and a second gateway each coupled to the communication network. The first gateway receives a first signal, detects partial characteristics of the first signal, and generates and sends a message that identifies at least one partial characteristic of the first signal. The first gateway is further operable to determine if the first signal is indicative of an event, and if so, to send an event message indicative of the event. The second gateway receives the message from the first gateway through the communication network and produces a second signal that has the at least one partial characteristic of the first signal. The second gateway is further operable to receive the event message and to determine a state of the first gateway based on the event message.

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

In an exemplary embodiment, two network endpoints, such as modems, may communicate through a packet network. The modems each will communicate with respective packet network endpoints, such as gateways, to exchange data. A packet network endpoint will receive an incoming signal from one modem and examine the incoming signal to determine characteristics of the signal. Once the packet network endpoint determines a characteristic of the signal, the endpoint will generate a data packet including the characteristic and send the data packet to the other packet network endpoint, which may then reproduce a signal that has that characteristic. The detecting packet network endpoint determines all characteristics of the signal as soon as possible and sends this information to the other packet network endpoint as each characteristic becomes known. Therefore, the packet network can take appropriate actions to minimize signal degradation and maximize the likelihood of voice band data and FAX call completion.

In this manner, DTMF signals and events, e.g., complete signals, may be sent incrementally to avoid the receiver waiting for the completion of the event. Events may be defined by signals that have a predetermined set of characteristics. Since some DTMF tones or events may be two seconds long or longer, waiting to transmit the DTMF tones and events until the tone is stopped, or until all characteristics have been identified, would incur a substantial delay. Therefore, according to an exemplary embodiment, a transmitter at a gateway may not know if the event length is important and may therefore transmit the event immediately and incrementally. If the receiver application (receiving gateway) does not care about event length, the incremental transmission mechanism avoids this delay since the detection of any event length is sufficient. However, depending on the application, some devices, such as gateways coupled to the public switched telephone network ("PSTN"), may be sensitive to both delays and event duration.

A. Communication Network

Figure 1:
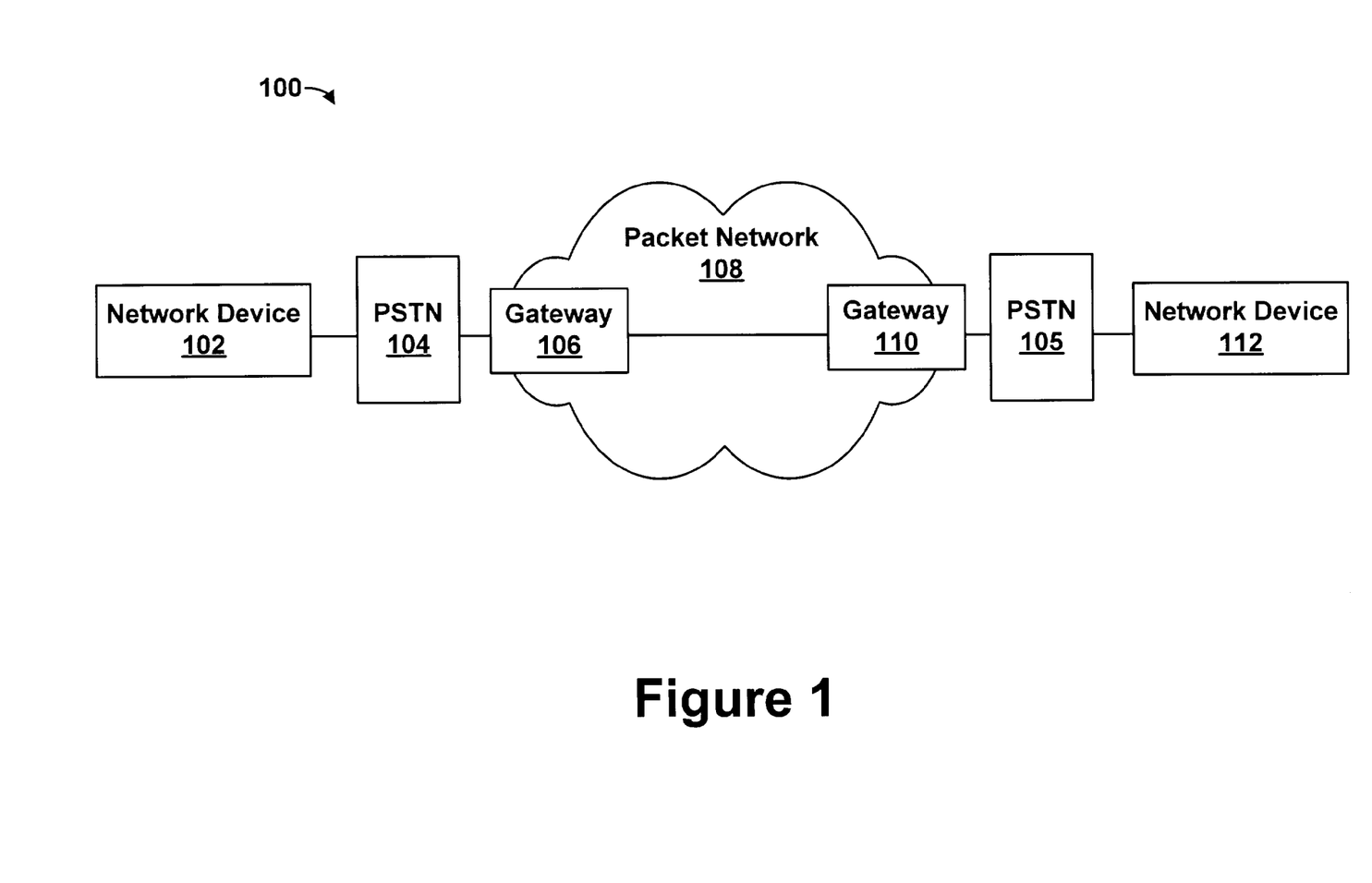
FIG. 1 illustrates a block diagram of one embodiment of a communication network.

Referring now to the figures, and more particularly to FIG. 1, a block diagram of one embodiment of a communication network 100 is illustrated. It should be understood that the network 100 illustrated in FIG. 1 and other arrangements described herein are set forth for purposes of example only, and other arrangements and elements can be used instead and some elements may be omitted altogether, depending on manufacturing and/or consumer preferences.

By way of example, network 100 includes a network device 102 coupled through a PSTN 104 to a gateway 106 of a packet network 108. The gateway 106 couples to another gateway 110, which establishes a communication session through a PSTN 105 to another network device 112. (PSTN 104 and 105 could also be the same network). Each of the couplings within the network 100 may be an interface such as a trunk level 1 (T1) line, an Ethernet line, a signaling link, or other connections (whether wired or wireless).

The network devices 102 and 112 illustrated in FIG. 1 represent entities that may communicate using the network 100, therefore the communication devices may represent a modem, a facsimile machine, a data network telephone, a computer, or other devices that may communicate over the network 100.

The packet network 108 represents any transport data packet network. For example, the packet network 108 may be an Internet Protocol ("IP") network. In addition, the packet network 108 may be arranged in any desired format such as a Wide Area Network ("WAN") or a Local Area Network ("LAN"), or may provide connectivity to such networks.

The gateways 106 and 110 operate to receive information from network devices 102 and 112, packetize the information, and send the data packets through the IP network 108. The gateways 106 and 110 may be VoIP gateways, which sample incoming audio signals to transmit audio data packets over the IP network 108. The gateways 106 and 110 may also be MoIP gateways or any network communication devices that communicate with each other.

As an example of communication over the communication network 100, network device 102 may originate a call to network device 112. For example, gateway 106 may initially establish a voice call with gateway 110. Gateway 106 may detect voice or tone signals such as DTMF, fax and modem tones from network device 102. The type of signal detected controls what type of call gateways 106 and 110 establish.

The signals that gateways 106 and 110 detect may be tone signals, such as dual tone multi-frequency ("DTMF") tones. Example types of signals that gateways 106 and 110 may detect are shown below in Table 1. The rows labeled "ITU . . . " refer to the recommendation E.180 disseminated by the International Telecommunication Union. Note that there are no specific guidelines for these tones. In the table, the symbol "+" indicates addition of the tones, without modulation, while "*" indicates amplitude modulation. The columns indicate the tone names, the frequency of the tone, and the amount of time that the tone occurs.

TABLE 1

Examples of telephony tones

| Tone name | Frequency | On Period | Off Period |
|---|---|---|---|
| CNG | 1100 | 0.5 | 3.0 |
| CED | 2100 | 3.3 | — |
| ANS | 2100 | 3.3 | — |
| ANSam | 2100*15 | 3.3 | — |
| ITU dial tone | 425 | — | — |
| U.S. dial tone | 350 + 440 | — | — |
| ITU ringing tone | 425 | 0.67-1.5 | 3-5 |
| U.S. ringing tone | 440 + 480 | 2.0 | 4.0 |
| ITU busy tone | 425 | | |
| U.S. busy tone | 480 + 620 | 0.5 | 0.5 |
| ITU congestion tone | 425 | | |
| U.S. congestion tone | 480 + 620 | 0.25 | 0.25 |

The CNG and CED tones are signals associated with a fax call. The CNG tone is a CalliNG tone. After dialing a fax machine's telephone number (and before it answers), the calling fax machine (optionally) begins sending a CNG tone consisting of an interrupted tone of 1100 Hz. The CED tone is a CallED terminal identification answer tone.

The ANS and ANSam tones are associated with data calls, such as between modems. The ANS tone is an answer tone that is a sinewave signal at 2100 Hz used to disable echo suppression in a gateway for data transmission. The ANSam tone is an answer tone that is amplitude modulated. For example, the ANSam signal is a 2100 Hz tone signal convolved with a 15 Hz signal. Additionally, $\overline{\text{ANS}}$ and $\overline{\text{ANSam}}$ signals are associated with data calls. These signals are the same as the ANS and ANSam signals, except that these signals reverse phases, e.g., incur a 180 degree phase reversal, at an interval of 450 +/−25 ms. The ANSam tone is sent by modems if network echo canceller disabling is not required.

The ITU and U.S. dial tones, ringing tones, busy tones, and congestion tones are conventional tones as known and used in the PSTN.

Figure 2:
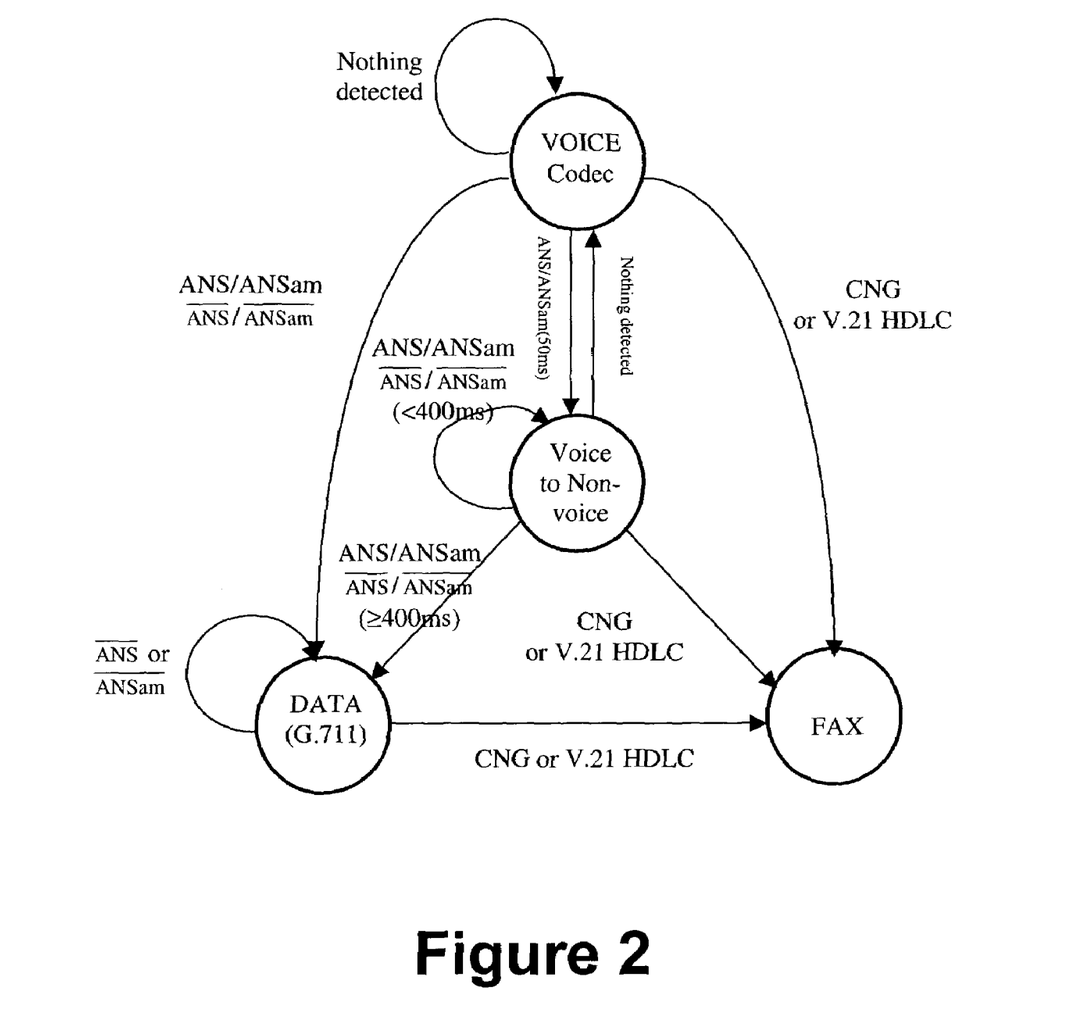
FIG. 2 illustrates a state machine that shows one embodiment of determining a call type.

There are 3 basic states that determine available call types: VOICE, DATA, and FAX. FIG. 2 illustrates a state machine that shows one embodiment of determining a call type. The initial state of a call type may be VOICE. All calls may be assumed to be voice so that a voice call will be established between gateways 106 and 110. In VOICE state, when an ANS and/or an ANSam signal is detected, the state will transition from VOICE to DATA. In addition, a transition directly from VOICE to Non-VOICE may occur if the ANS or ANSam signal is detected within 50 ms. A transition from VOICE to FAX will occur if a CNG or a V.21 high level data link ("HDLC") signal is detected. (The V.21 specification describes a 300 b/s full-duplex modem that employs frequency shift keying. It can also be used by Group 3 fax machines to exchange information. According to V.21, the calling device transmits on channel 1 and receives on channel 2; the receiver transmits on channel 2 and receives on channel 1. Each bit value has a distinct tone, so that V.21 signaling comprises a total of four distinct tones).

While in the DATA state, if an $\overline{\text{ANS}}$ or $\overline{\text{ANSam}}$ signal is detected, then the gateways will remain in DATA state. If a CNG or V.21 HDLC signal is detected, then a transition is made to the FAX state.

While in the Non-VOICE state, if an ANS, ANSam, $\overline{\text{ANS}}$, or $\overline{\text{ANSam}}$ signal is detected in less than 400 ms, then the gateways remain in the Non-VOICE state. If any of these signals are detected after 400 ms, then a transition is made to the DATA state. Furthermore, if a CNG or V.21 HDLC signal is detected, then a transition is made to the FAX state.

In FIG. 2, "nothing detected" means nothing related to telephony answer tones are detected. When none of above signals is detected, the state is kept in the initial VOICE state.

B. Detecting Tone Signals

Figure 3:
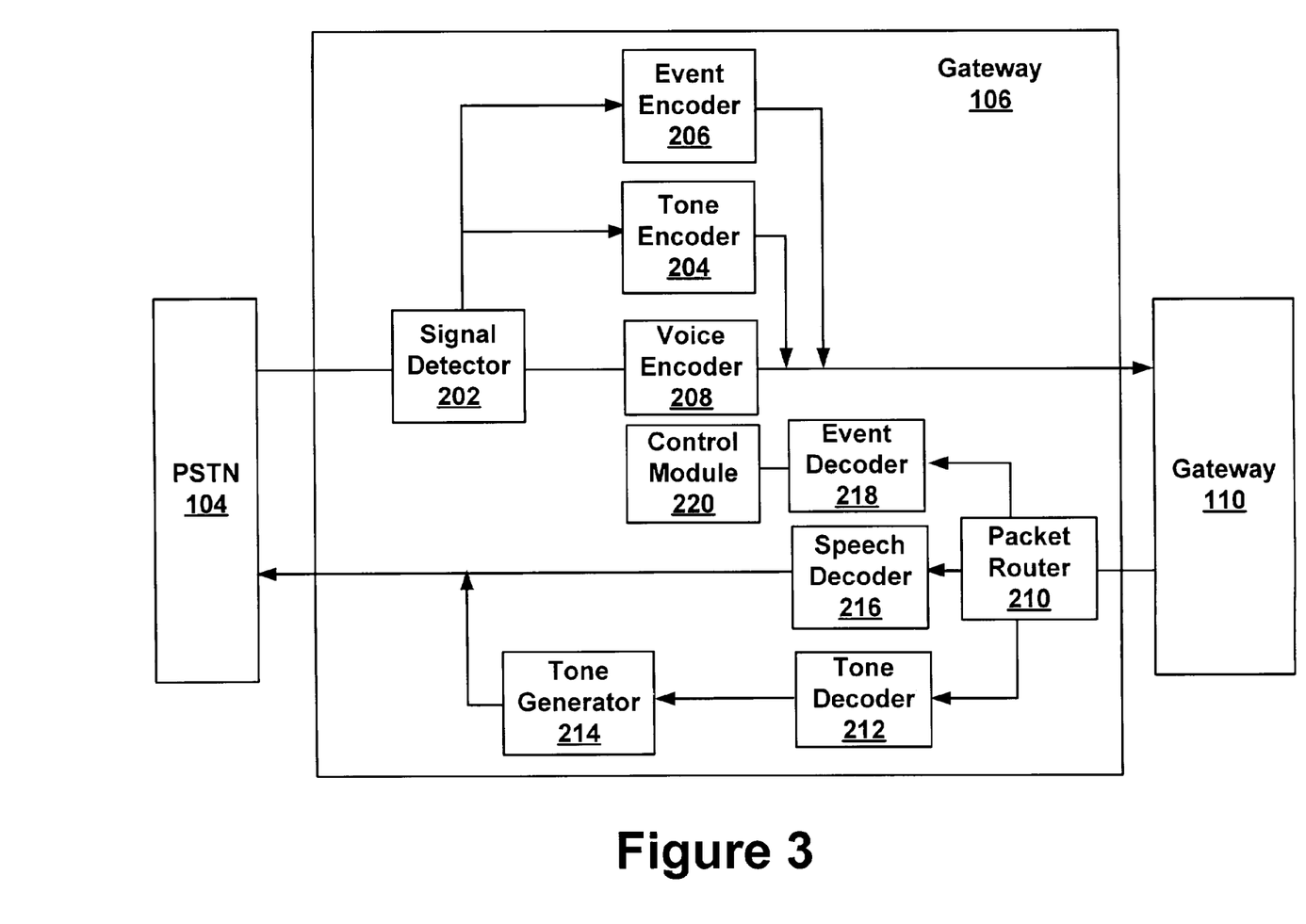
FIG. 3 illustrates one embodiment of a gateway within the communication network of FIG. 1.

In an exemplary embodiment, gateways 106 and 110 may detect tone signals from network devices 102 and 112 by making an examination of an incoming signal received from network devices 102 and 112. FIG. 3 illustrates one embodiment of gateway 106. Gateway 106 may include a reception and a transmission signal path. The transmission signal path includes a signal detector 202, a tone encoder 204, an event encoder 206, and a voice encoder 208. The reception signal path includes a packet router 210, a tone decoder 212, a tone generator 214, a speech decoder 216, an event decoder 218, and a control module 220. It should be understood that gateway 106 is set forth for purposes of example only, and other arrangements and elements can be used instead and some elements may be omitted altogether. Further, many of the elements of gateway 106 are functional entities that may be implemented as hardware, firmware or software, and as discrete components or in conjunction with other components, in any suitable combination and location.

Signal detector 202 couples to PSTN 104. Signal detector 202 may receive signals from network device 102 and detect or identify partial characteristics of the signals. For example, signal detector 202 may detect that an incoming signal is a 2100 Hz tone, or that an incoming signal is frequency modulated. Signal detector 202 may continuously detect received signals until signal detector 202 determines that the signal is indicative of an event (described more fully below). Signal detector 202 may be a general type of detector, which can detect frequencies, changes in phases of signals, and signal cadence (on/off period). Signal detector 202 may include a bank of filters to identify a frequency of an incoming signal, a phase detector, to identify phase changes of an incoming signal, and other components as well, such as a frequency shift key ("FSK") demodulator, to detect an HDLC signal, for example.

In addition, signal detector 202 may be able to detect signals within a specified time frame. For example, signal detector 202 may detect a 2100 Hz tone within 100 ms or less. For early detection of the ANS/ANSam signal, signal detector 202 may only need to detect the presence of a 2100 Hz tone.

Tone encoder 204 is coupled to signal detector 202. After signal detector 202 detects a partial characteristic of an incoming signal, signal detector 202 sends this information to tone encoder 204, which generates a data packet containing this information and sends the data packet to gateway 110.

Tone encoder 204 will generate a new data packet each time signal detector 202 detects another partial characteristic of the incoming signal. Each subsequent data packet will contain all partial characteristics previously sent and the new partial characteristic that was just detected.

Event encoder 206 is coupled to signal detector 202. Event encoder 206 may determine when an event has occurred based on the characteristics of signals identified by signal detector 202. An event is defined by a signal that has a predetermined set of characteristics. For example, an ANSam event is defined by an ANSam signal that comprises a 2100 Hz tone, which is modulated with a 15 Hz signal. After signal detector 202 detects the partial characteristics of the signal, such as the 2100 Hz tone and the 15 Hz modulation, event encoder 206 may then name this signal as an ANSam signal, and generate a data packet containing this information to notify gateway 110 of this event.

Voice encoder 208 is coupled to signal detector 202. Signal detector 202 will send the incoming signal to voice encoder 208 if the incoming signal does not contain any tones, i.e., the signal comprises speech. Voice encoder 208 may then compress the speech in a data packet and send the speech to gateway 110 to be sent to network device 112.

Packet router 210 receives messages from gateway 110, or other packet network devices. Packet router 210 then routes the messages to the tone decoder 212 if the messages contain tone packets, to the speech decoder 216 if the messages are simply compressed speech, or to the event decoder 218 if the messages are event packets.

Tone decoder 212 will receive the messages and parse the tone packet to identify the partial characteristics of the signal, which are indicated by the information in the messages. Tone decoder 212 will then send the partial characteristics to tone generator 214, which may then generate a signal that has the designated partial characteristics. Note at this point, tone generator 214 may not be able to fully generate an incoming signal as seen by the gateway which sent the messages, since tone generator 214 simply knows partial characteristics of the incoming signal. Tone generator 214 may comprise an oscillator that can generate sine functions indicative of tone signals.

Speech decoder 216 will receive the messages from packet router 210 if the messages simply comprise compressed speech. Speech decoder 216 may then uncompress the speech and pass it on to network device 102.

Event decoder 218 may receives messages that indicative of events that have occurred. Event decoder 218 will receive the message and determine what event has occurred by using a lookup table, for example. Event decoder 218 will then inform control module 220 that an event has occurred. Control module 220 will then use this information to determine what type of call has been established and/or to determine what state gateway 110 is in. For example, if the event indicates a CNG signal, then control module 220 may determine that gateway 110 is in a fax mode.

C. Communicating Tone Signals Between Gateways

In an exemplary embodiment, once gateway 106 receives a signal from network device 102 and detects a partial characteristic of the signal, gateway 106 will clamp the incoming signal and also generate a tone packet that includes the partial characteristic and send the tone packet to gateway 110. In effect, gateway 106 may take the signal out of the data path between gateway 106 and gateway 110, and replace it with a tone packet that includes partial information about the signal that itself is insufficient to fully define the signal. For example, gateway 106 may receive an ANSam signal and first determine that it has received a 2100 Hz tone. This information alone is insufficient to fully define the ANSam signal. Not until gateway 106 identifies the 15 Hz modulation can gateway 106 fully identify the ANSam signal.

Gateway 106 clamps the signal after identifying a partial characteristic so as not to send the signal to gateway 110. However, after clamping the signal, gateway 106 still examines the signal to identify additional partial characteristics of the signal in order to fully define the signal according to a set of predefined characteristics of the signal. The predetermined set of characteristics of the signal will be sufficient to fully define the incoming signal according to the predefined signal types. For example, the predetermined set of characteristics may include a 2100 Hz tone and a 15 Hz modulation tone. This set will then fully define an ANSam signal type.

Figure 4:
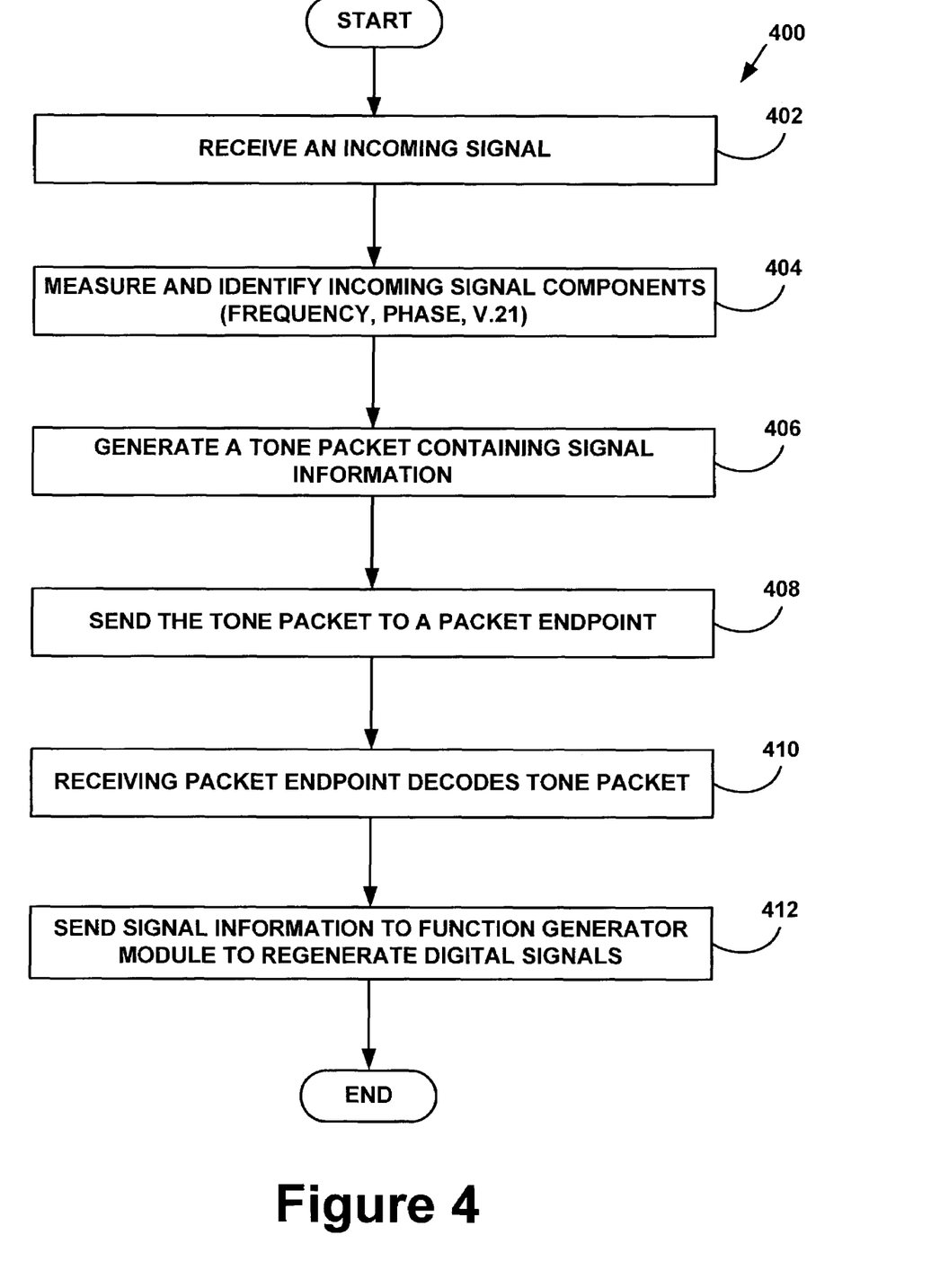
FIG. 4 illustrates a flowchart that depicts one embodiment of a method of communicating signals between gateways.

FIG. 4 illustrates a flowchart that depicts a method 400 of communicating signals between gateways. Initially, gateway 106 will receive an incoming signal, as shown at block 402. Gateway 106 may then measure and identify components of the incoming signal, as shown at block 404. For example, gateway 106 may measure frequency or phase components, or characteristics according to V.21. Gateway 106 will then generate a packet containing this information and send the packet to a packet network endpoint, such as gateway 110, as shown at blocks 406 and 408. Gateway 106 may transmit the packet using the real time protocol ("RTP") (described more fully below).

The receiving packet endpoint, e.g., gateway 110, a personal computer, or a telephone, may then receive and decode the tone packet, as shown at block 410. The recognition of a signal often depends on its on/off pattern or the sequence of several tones. This recognition can take several seconds. So initially, only the frequency component of the signal may be sent for tone signals. After recognizing the signal, gateway 110 may then send the signal information to a function generator module to regenerate the digital signal if the signal is a tone signal, as shown at block 412 (described more fully below).

Figure 5:
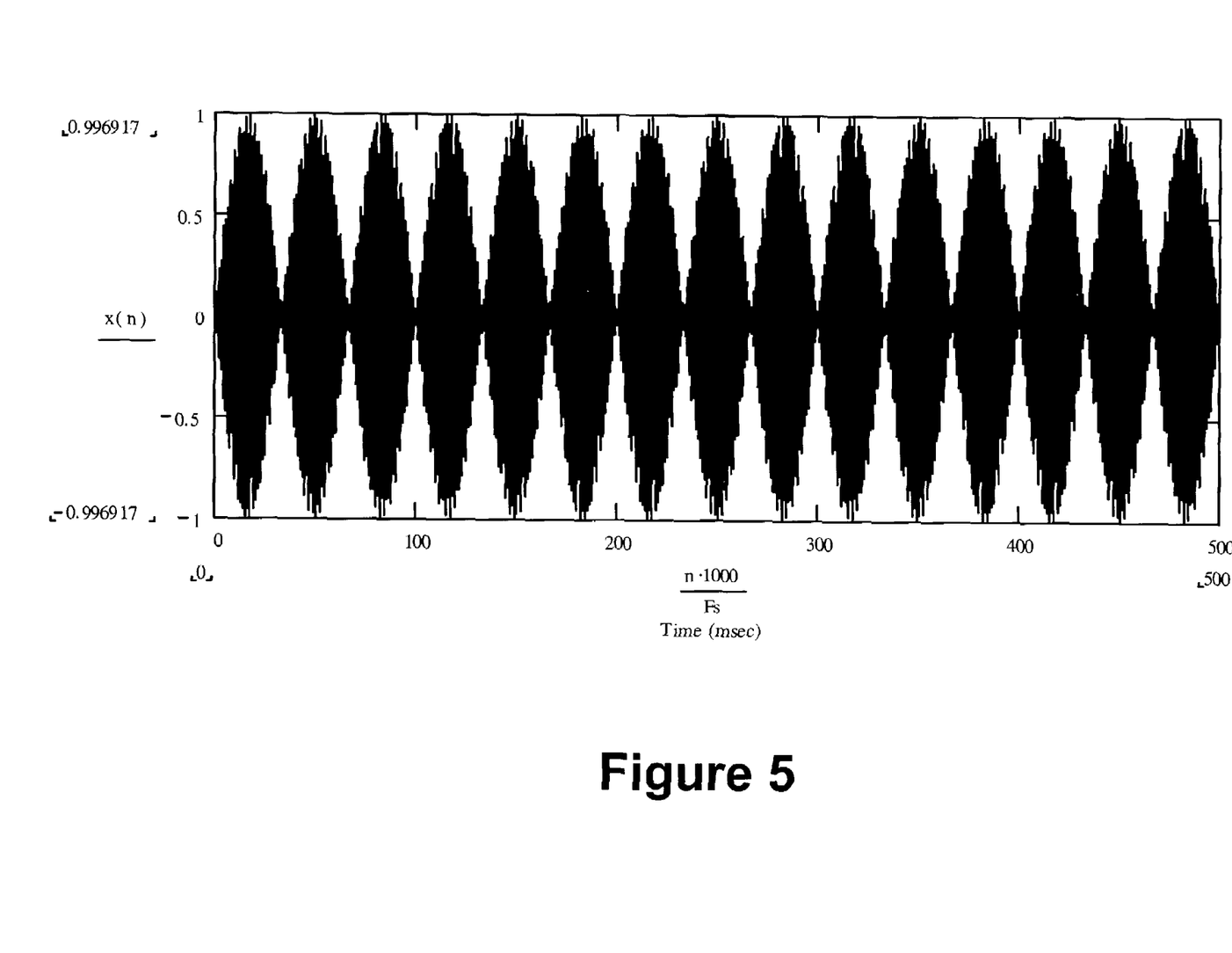
FIG. 5 illustrates an example of an incoming signal received by a gateway.

As an example, FIG. 5 illustrates an example of an incoming signal, x(n), over a 500 ms time period. The incoming signal illustrated is an $\overline{\text{ANSam}}$ signal. The signal is a 2100 Hz tone modulated by a 15 Hz modulation frequency, that undergoes a 180 degree phase change every 450 ms. Signal detector 202 of gateway 106 receives this signal.

Figure 6:
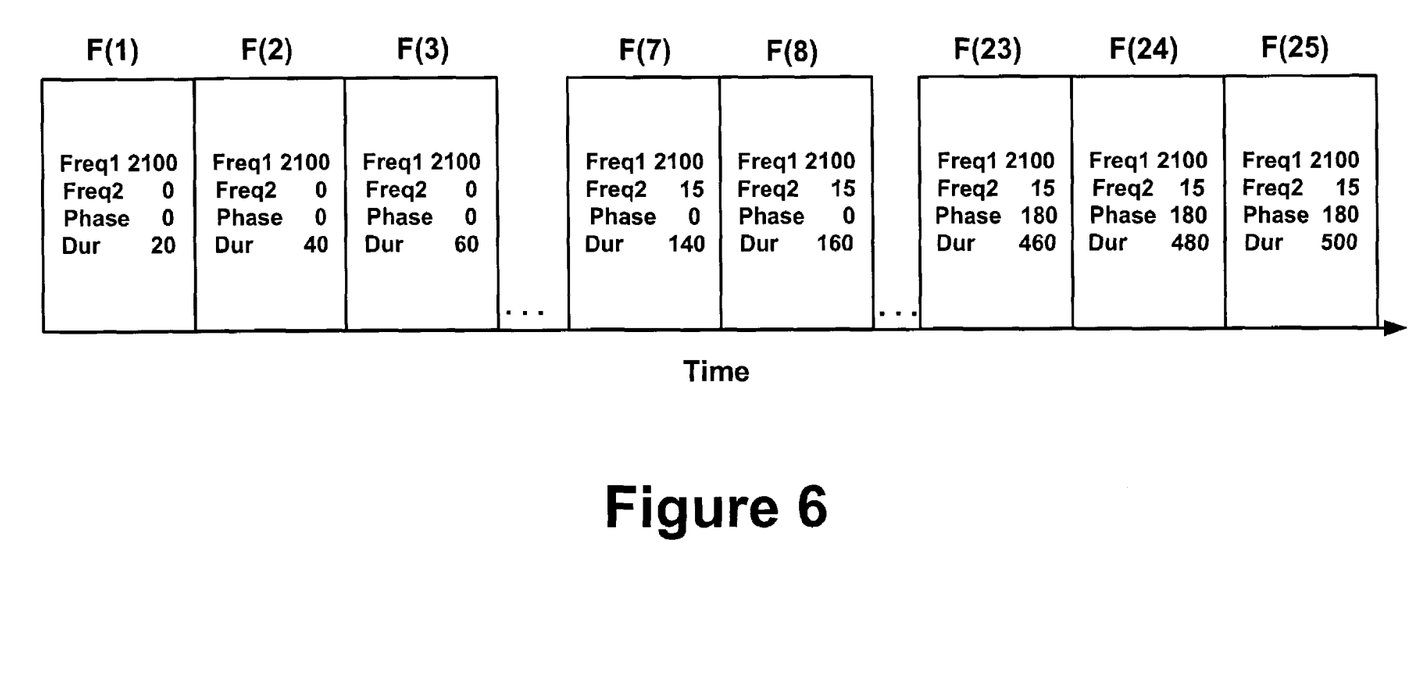
FIG. 6 illustrates an example of a timeline that depicts data packets sent at specified frame intervals.

FIG. 6 illustrates a timeline that depicts data packets sent at specified frame intervals for an incoming signal as illustrated in FIG. 5. Suppose the $\overline{\text{ANSam}}$ tone is received by gateway 106. Signal detector 202 will initially detect a 2100 Hz tone within frame 1 (F(1)), after 20 ms, for example. Tone encoder 204 will then generate a tone packet that contains the 2100 Hz in a frequency 1 field and the 20 ms in a duration field. After F2 and F3, signal detector 202 may not detect any more partial characteristics, but after F7 or after 140 ms, signal detector 202 may then detect a 15 Hz modulation of the signal because after this time period, two complete periods of the signal will have transpired. Tone encoder 204 may then generate a tone packet containing this information. After 160 ms, or at F8, again signal detector 202 may not have detected any additional partial characteristics.

Subsequently, after F23 or after 460 ms, signal detector 202 will then detect a 180 degree phase change in the signal, and tone encoder 204 will generate a tone packet containing this information. After frames F24 and F25, signal detector 202 will not detect any additional partial characteristics. Signal detector 202 may not detect any additional partial characteristics in this example until F45 or 900 ms, since an $\overline{\text{ANSam}}$ signal undergoes phase changes every 450 ms.

Each subsequent tone packet generated by tone encoder 204 will contain all information sent previously in tone packets according to this incoming signal. Tone encoder 204 will continue sending tone packets every frame interval, until it is determined whether an event is established by this signal, e.g., whether the signal is ANS or ANSam, or possibly an $\overline{\text{ANS}}$ or $\overline{\text{ANSam}}$ signal. In this example, it may be determined that an event has occurred after F23.

Once gateway 110 receives a packet from gateway 106 that includes partial signal characteristics, gateway 110 will reproduce the signal according to the characteristics. Once gateway 106 receives additional packets that contain more information of the signal, gateway 110 may then reproduce the signal as seen by gateway 106. For example, initially gateway 106 may determine that an incoming signal has an 2100 Hz tone, and then that the signal is modulated with a 15 Hz tone signal, and finally that the signal contains a 180 degree phase change. Gateway 110 may then reproduce the signals in increments by first receiving information indicating the 2100 Hz signal, then the 15 Hz modulation and then the 180 degree phase change. Therefore, gateway 110 would initially produce a signal that includes a 2100 Hz tone, and then produce a signal that includes a 2100 Hz tone modulated by a 15 Hz tone, and then produce a signal that includes a 2100 Hz tone modulated by a 15 Hz tone and including a 180 phase change after 450 ms.

In one embodiment, a gateway places a tone of the given duration in an audio playout buffer of the tone generator 214 at the location indicated by the timestamp to regenerate the tone. As additional packets are received that extend the same tone, or provide more information to recreate the event, the waveform in the playout buffer is extended in time accordingly. Alternatively, a gateway can start a tone and play it until it receives either a packet that indicates that this packet contains the end of the event, or the next tone. A packet may be distinguished from other packets by a different timestamp value or if a given time period elapses.

Figure 7:
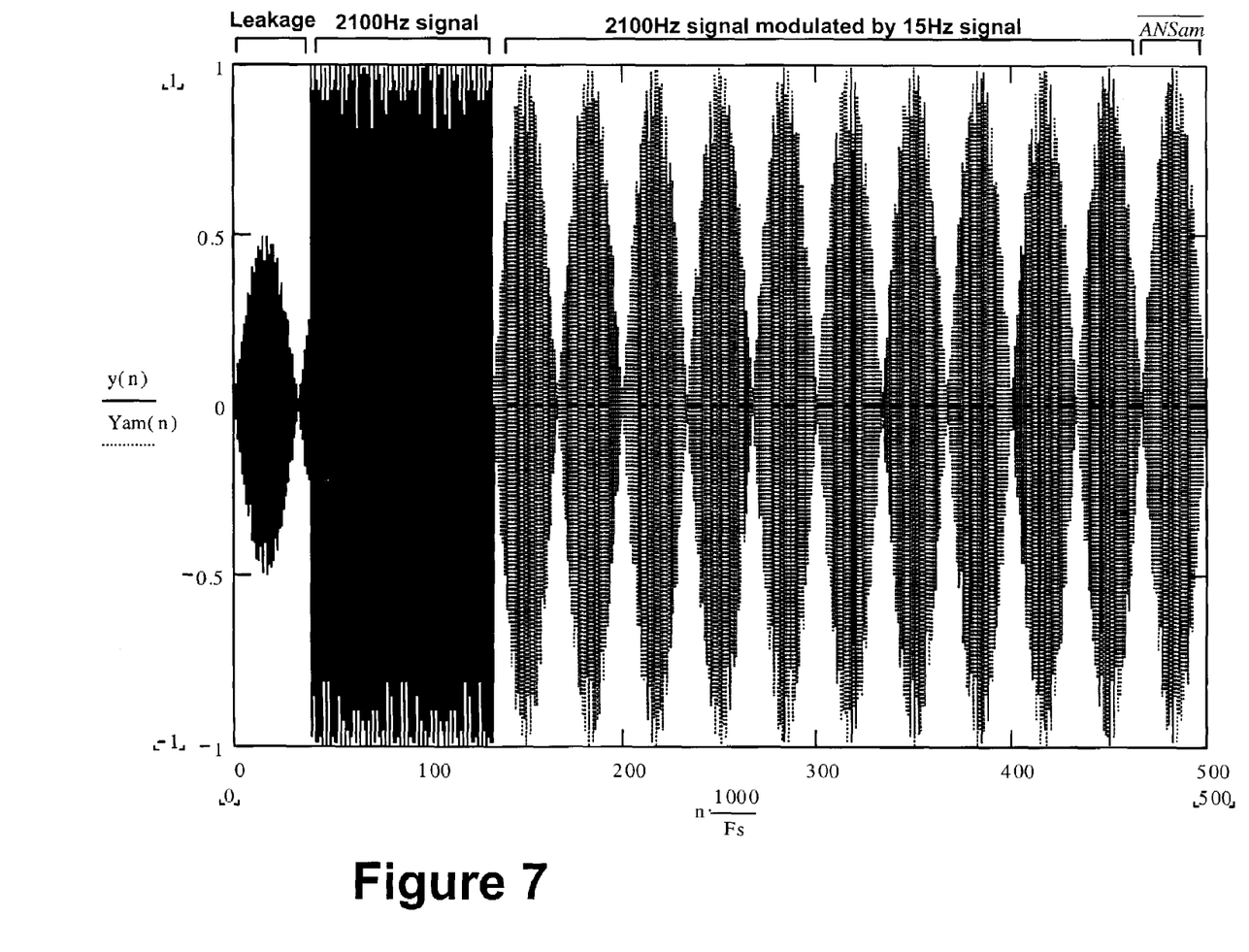
FIG. 7 illustrates an example of an output signal of a gateway in response to a tone packet.

FIG. 7 illustrates an example of an output signal (y(n)) of a gateway in response to tone packets, such as the tone packets illustrated in FIG. 6, for example. Tone decoder 212 may generate the output signal. Initially, from 0-40 ms, tone generator 214 may simply produce noise, which may be caused by received leakage signals from the gateway. Then after about 40 ms, tone decoder 212 will receive the first tone packet, such as packet F1 of FIG. 6. Tone generator 214 will then generate a 2100 Hz signal, as indicated by the tone packet. This 2100 Hz signal is insufficient itself to fully define the incoming signal, as illustrated in FIG. 5, because this 2100 Hz signal is simply a component of the signal of FIG. 5.

Since packets F2-F6 do not indicate any additional partial characteristics of the incoming signal, tone generator 214 will simply generate this 2100 Hz signal during this time period. After 140 ms, tone decoder 212 will receive F7, and tone generator 214 may now modulate the 2100 Hz signal with a 15 Hz modulation frequency. Now the output signal is indicate of an ANSam signal, however, the output signal is still insufficient to fully define the incoming signal as illustrated in FIG. 5.

During the next frame intervals from F8-F22, tone decoder 212 does not receive any new partial characteristics. Therefore, during the 160-440 ms time period, the modulated signal is generated. After approximately 460 ms, tone decoder 212 will receive F23 and now tone generator 214 will generate a phase change in the modulated signal. This signal now represents the incoming signal as seen by the gateway (i.e., an $\overline{\text{ANSam}}$ signal), which has transmitted the tone packets.

Generating the output signal in this manner may substantially reduce the time to communicate tone signals between gateways because the signal is regenerated by a receiving gateway as soon as possible since the transmitting gateway will transmit signal characteristics to the receiving gateway at the moment it determines them. Thus, the transmitting gateway detects characteristics of the signal in a time interval that is less than a minimum time duration required to unambiguously define the signal, and the receiving gateway then may regenerate the signal in pieces using the identified characteristics.

D. Communicating Events Between Gateways

In another embodiment, gateway 106 may receive an incoming signal, recognize that the signal is a tone signal and assign a name to the signal, such as ringing or busy tone signal for example. Gateway 106 may then send the name, or other event identifier, in an event packet to gateway 110. Gateway 110 will receive the event packet and then produce a tone as indicated by the event packet.

Gateway 106 will recognize that an event has occurred after detecting all predetermined characteristics of the event. Initially, as described above, gateway 106 will detect partial characteristics of an incoming signal. The partial characteristics are simply subsets of the predetermined set of characteristics. The subsets may include one or more partial characteristics. After all partial characteristics have been detected, then all predetermined characteristics of the event will have been detected, and therefore, gateway 106 can declare that an event has occurred.

As an example, gateway 106 may detect DTMF digits, data from modems, fax related events, or in-band PSTN signaling (line events), for example, and gateway 106 may then dynamically generate a corresponding event packet. The event packet may identify the received signal. If gateway 106 receives an ANS signal for example, gateway 106 will examine the signal and determine partial characteristics of the signal, as described above. Once gateway 106 determines all the partial characteristics of the signal, gateway 106 can then identify the signal and name the signal, possibly as a decimal encoded name. Subsequently, gateway 106 can send the name of the signal in a packet to gateway 110.

Figure 8:
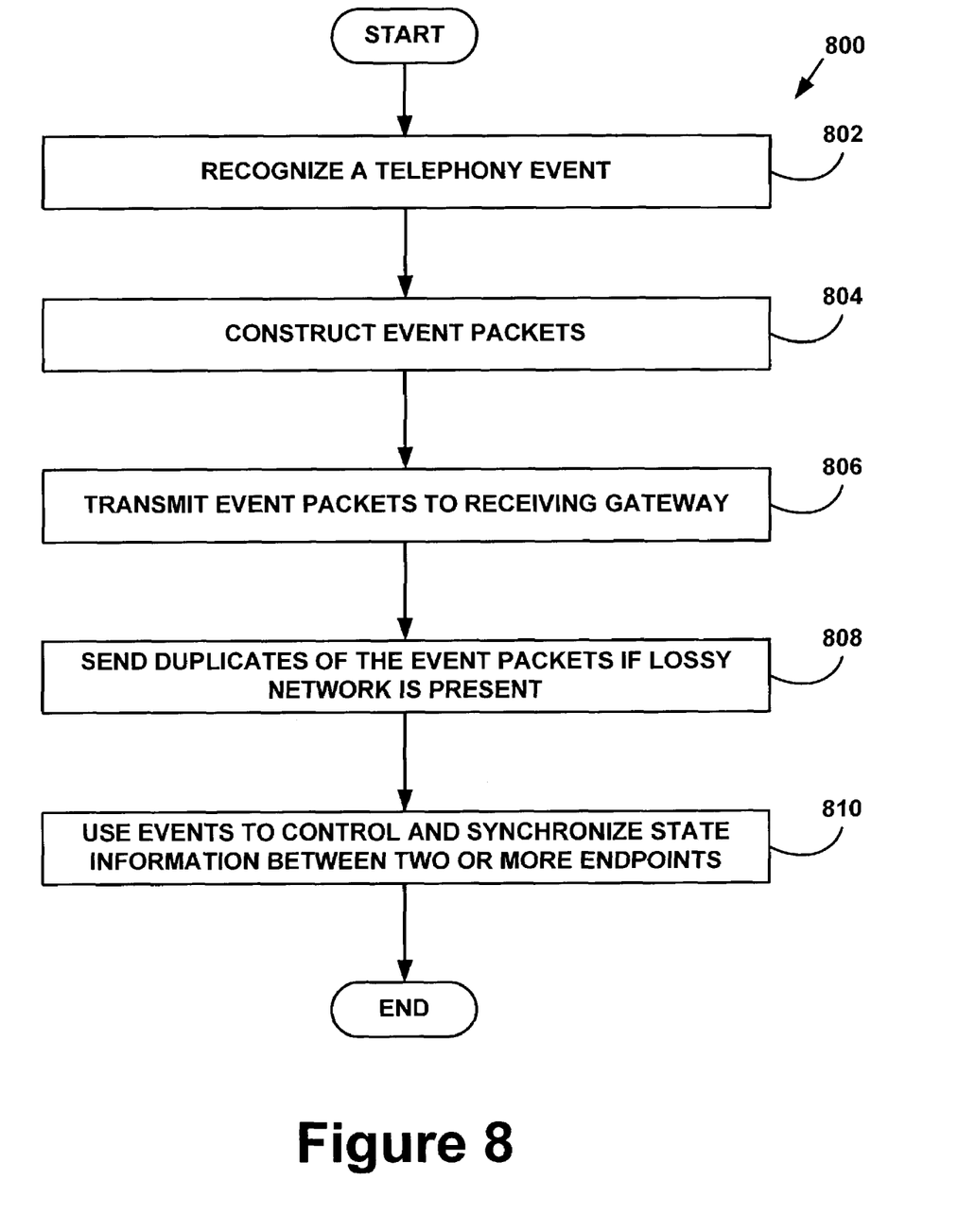
FIG. 8 illustrates a flow chart that depicts one embodiment of a method of event detection and notification.

FIG. 8 illustrates a flow chart that depicts one embodiment of event detection and notification. In general, gateway 106 may perform the following steps on detection of an event. Gateway 106 may initially recognize that an event has occurred, as shown at block 802, by recognizing that a predetermined set of characteristics has been detected, for example. Gateway 106 may then construct and start transmitting event packets that contain event identifiers, as shown at blocks 804 and 806, as soon as gateway 110 recognizes the event and every frame interval thereafter, until the event is over. The event packets may include decimal encoded names of the events specified. After the event is over, gateway 106 may send two or three duplicates of the last event packet during the next frame intervals, as shown at block 808, if the gateway sends the packets through a lossy network. (Gateway 106 may not send duplicates if gateway 106 sends the packets through a reliable network, or by using a reliable protocol).

Subsequently, the receiving gateway uses the events to control and synchronize state information between two or more communication network endpoints, e.g., telephones, as shown at block 810

Table 2 below summarizes DTMF-related named events within a telephone-event payload format.

TABLE 2

DTMF named events

| Event | Encoding (decimal) |
| --- | --- |
| 0-9 | 0-9 |
| * | 10 |
| # | 11 |
| A-D | 12-15 |
| Flash | 16 |

Other exemplary events and corresponding encoded decimal representations used as event names are shown below in Table 3.

TABLE 3

Data and Fax Named Events

| Event | Encoding (decimal) |
| --- | --- |
| ANS | 32 |
| $\overline{\text{ANS}}$ | 33 |
| ANSam | 34 |
| $\overline{\text{ANSam}}$ | 35 |
| CNG | 36 |
| V.21 channel 1, "0" bit | 37 |
| V.21 channel 1, "1" bit | 38 |
| V.21 channel 2, "0" bit | 39 |
| V.21 channel 2, "1" bit | 40 |
| CRdi | 41 |
| CRdr | 42 |
| CRe | 43 |
| ESi | 44 |
| ESr | 45 |
| MRdi | 46 |
| MRdr | 47 |
| MRe | 48 |
| CT | 49 |

The CRdi event is a capabilities request on the initiating side. The CRdi is a dual-tone signal with tones at 1375 Hz and 2002 Hz for 400 ms, followed by a single tone at 1900 Hz for 100 ms. Therefore, partial characteristics of this signal would include the 1375 Hz and 2002 Hz tone and the 1900 Hz tone. The CRdi signal is not fully defined until all three tones have been identified. This signal requests the remote station transition from telephony mode to an information transfer mode and requests the transmission of a capabilities list message by the remote station. In particular, CRdi is sent by the initiating station during the course of a call, or by the calling station at call establishment in response to a CRe or MRe.

The CRdr event is the response tone to CRdi. It consists of a dual-tone signal with tones at 1529 Hz and 2225 Hz for 400 ms, followed by a single tone at 1900 Hz for 100 ms. These set of tones fully define the CRdr signal.

The Cre event is a capabilities request (CRe) event that is a dual-tone signal with tones at frequencies at 1375 Hz and 2002 Hz for 400 ms, followed by a single tone at 400 Hz for 100 ms. This signal requests the remote station transition from telephony mode to an information transfer mode and requests the transmission of a capabilities list message by the remote station. In particular, CRe is sent by an automatic answering station during call establishment.

The Ct event is a calling tone that consists of a series of interrupted bursts of binary 1 signal or 1300 Hz tone signals, which are on for a duration of not less than 0.5 seconds and not more than 0.7 seconds and off for a duration of not less than 1.5 seconds and not more than 2.0 seconds. Modems not starting with the V.8 call initiation tone often use this tone, for example.

The ESi event is an Escape Signal (ESi) that is a dual-tone signal with tones at 1375 Hz and 2002 Hz for 400 ms, followed by a single tone at 980 Hz for 100 ms. This signal requests the remote station transition from telephony mode to an information transfer mode.

The ESr event is an Escape Signal (ESr) event that is a dual-tone signal with tones at 1529 Hz and 2225 Hz for 400 ms, followed by a single tone at 1650 Hz for 100 ms. This event is the same as ESi but sent by the responding station.

The MRdi event is a Mode Request (MRd) event, initiating side, that is a dual-tone signal with tones at 1375 Hz and 2002 Hz for 400 ms followed by a single tone at 1150 Hz for 100 ms. This signal requests the remote station transition from telephony mode to an information transfer mode and requests the transmission of a mode select message by the remote station. In particular, the MRd signal is sent by the initiating station during the course of a call, or by the calling station at call establishment in response to an MRe.

The MRdr event is the response tone to MRdi (see above). It consists of a dual-tone signal with tones at 1529 Hz and 2225 Hz for 400 ms, followed by a single tone at 1150 Hz for 100 Ms.

The Mode Request event (MRe) is a dual-tone signal with tones at 1375 Hz and 2002 Hz for 400 ms, followed by a single tone at 650 Hz for 100 ms. This signal requests the remote station transition from telephony mode to an information transfer mode and requests the transmission of a mode select message by the remote station. In particular, the MRe signal is sent by an automatic answering station at call establishment.

Each of the above events listed in Table 3 are fully defined by multiple partial characteristics. Single partial characteristics may be insufficient to fully define these signals.

Tones for telephony events for example, are in the range of 25 Hz (ringing tone in Angola) to 1800 Hz. Depending on the country, a tone frequency may be as high as 2100 Hz. Since the telephone frequency range is limited to 3,400 Hz, a tone signal could extend up to this frequency. Modulation frequencies range between 15 Hz (ANSam tone) to 480 Hz (Jamaica, for example). Non-integer frequencies of 16⅔ Hz and 33⅓ Hz may also be used.

A summary of common events and tones that can appear are listed below in Table 4.

TABLE 4

| Event | encoding (decimal) |
| --- | --- |
| Off Hook | 64 |
| On Hook | 65 |
| Dial tone | 66 |
| PABX internal dial tone | 67 |
| Special dial tone | 68 |
| Second dial tone | 69 |
| Ringing tone | 70 |
| Special ringing tone | 71 |
| Busy tone | 72 |
| Congestion tone | 73 |
| Special information tone | 74 |
| Comfort tone | 75 |
| Hold tone | 76 |
| Record tone | 77 |
| Caller waiting tone | 78 |
| Call waiting tone | 79 |
| Pay tone | 80 |
| Positive indication tone | 81 |
| Negative indication tone | 82 |

TABLE 4-continued

| Event | encoding (decimal) |
|---|---|
| Warning tone | 83 |
| Intrusion tone | 84 |
| Calling card service tone | 85 |
| Payphone recognition tone | 86 |
| CPE alerting signal (CAS) | 87 |
| Off-hook warning tone | 88 |
| Ring | 89 |

The following is a description of the above events:

Dial tone: The exchange is ready to receive address information.

PABX internal dial tone: The private automatic branch exchange ("PABX") is ready to receive address information.

Special dial tone: Same as a conventional dial tone, but the caller's line is subject to a specific condition, such as call diversion or a voice mail is available (e.g., "stutter dial tone").

Second dial tone: The network has accepted the address information, but additional information is required.

Ring: This named signal event causes the recipient to generate an alerting signal ("ring"). The actual tone or other indication used to render this named event is left up to the receiver. This differs from the ringing tone heard by the caller.

Ringing tone: The call has been placed to the callee and a calling signal (ringing) is being transmitted to the callee. This tone is also referred to as "ringback".

Special ringing tone: A special service, such as call forwarding or call waiting, is active at the called number.

Busy tone: The called telephone number is busy.

Congestion tone: Facilities necessary for the call are temporarily unavailable.

Calling card service tone: The calling card service tone consists of 60 ms of the sum of 941 Hz and 1477 Hz tones (DTMF '#'), followed by 940 ms of 350 Hz and 440 Hz (U.S. dial tone), decaying exponentially with a time constant of 200 ms.

Special information tone: The callee cannot be reached, but the reason is neither "busy" nor "congestion". This tone may be used before all call failure announcements, for the benefit of automatic equipment.

Comfort tone: The call is being processed. This tone may be used during long post-dial delays, e.g., in international connections.

Hold tone: The caller has been placed on hold.

Record tone: The caller has been connected to an automatic answering device and is requested to begin speaking.

Caller waiting tone: The called station is busy, but has call waiting service.

Pay tone: The caller, at a payphone, is reminded to deposit additional coins.

Positive indication tone: The supplementary service has been activated.

Negative indication tone: The supplementary service could not be activated.

Off-hook warning tone: The caller has left the instrument off-hook for an extended period of time.

The following tones can be heard by either a calling or called party during a conversation:

Call waiting tone: Another party wants to reach the subscriber.

Warning tone: The call is being recorded.

Intrusion tone: The call is being monitored, for example, by an operator.

CPE (Customer Premises Alert) alerting signal: A tone used to alert a device to an arriving in-band FSK data transmission. A CPE alerting signal is a combined 2130 and 2750 Hz tone, both with tolerances of 0.5% and a duration of 80 to 80 ms. The CPE alerting signal is used with ADSI services and Call Waiting ID services.

A payphone recognition tone is heard by operators to allow the operator to determine whether the person making the call or being called is using a payphone (and thus it is ill-advised to allow collect calls to such a person).

E. Sending the Messages

The RTP may be used for transmitting any telephony event and telephone tone signals between gateways. Exemplary tone signals are ringing (ringback), busy, congestion ("fast-busy"), special announcement tones or other special tones, such as payphone recognition, call waiting or record tone. Across international countries, these tone signals share a number of characteristics. Telephony tones consist of either a single tone frequency, the addition of two or three tone frequencies or the modulation of two tone frequencies. Almost all tones use two-tone frequencies and a few tones use three frequencies. For example, the Hungarian "special dial tone" has three tone frequencies. Additionally, tones that are mixed typically have the same amplitude.

The payload format of a tone packet or event packet, may contain a first payload of DTMF digits and trunk signals and a second payload of multi-frequency tones. The components of the RTP payload header comprise the following fields:

Event(s) (8 bits): The events are encoded in an 8 bit field.

Volume (6 bits): For DTMF digits and other events representable as tones, this field describes the power level of the tone, expressed in dBm0 after dropping the sign. Power levels may range from 0 to −63 dBm0 although other power ranges are possible. The range of valid DTMF volume values is from 0 to −36 dBm0. Volume values lower than −55 dBm0 may be rejected. For events not utilizing a tone, the volume field may be set to zero by the sender and ignored by the receiver.

Duration (16 bits): Duration of the event, in timestamp units. Thus, the event began at the instant identified by an RTP timestamp and has so far lasted as long as indicated by this parameter. Note that the event may or may not have ended. For example, if the present packet being sent simply contains a first characteristic of an incoming signal, the event most likely has not ended.

E the "end" bit (1 bit): If set to a value of one, the "end" bit indicates that this packet contains the end of the event. Thus, the duration parameter above measures the complete duration of the event. A gateway may delay setting the end bit until retransmitting the last packet for a tone, rather than on its first transmission. This avoids waiting to detect whether the tone has indeed ended.

Modulation (9 bits): The modulation frequency in Hz. This field is a 9-bit unsigned integer, allowing modulation frequencies up to 511 Hz. If there is no modulation, this field has a value of zero.

T (1 bit): If the "T" bit is set to "one", the modulation frequency is to be divided by three. Otherwise, the modulation frequency is taken as is. This bit allows frequencies accurate to ⅓ Hz, since modulation frequencies such as 16⅔ Hz may be used in practice.

Frequency (12 bits): The frequencies of the tones to be added, measured in Hz and represented as a 12-bit unsigned integer. This field size is sufficient to represent frequencies up to 4095 Hz, which exceeds the range of telephone systems. A value of zero indicates silence. A single tone can contain any number of frequencies.

Timestamp: The timestamp associated with an RTP packet reflects the measurement point for the current packet. The event duration described above extends forward from that time. Therefore, if an event continues for more than one period, the sender will send a new event packet with the RTP Timestamp value corresponding to the beginning of the event and the duration of the event increased correspondingly. (The RTP sequence number is incremented by one for each packet.)

The payload format may include information messages and named telephone events. The payload formats described are suitable for both gateway-gateway, network device-gateway and network device-network device call scenarios. In the gateway scenarios, a gateway connecting a packet voice network such as IP network to the PSTN network generally recreates the fax, modem, and DTMF tones or other telephony events from an RTP payload. The receiving gateway then transmits the events to the callee via the PSTN.

F. Combining Tones and Named Events

Gateways that send signaling events via RTP may send both the named event and the tone representation in a single RTP packet, using a redundancy mechanism to interleave the two representations, for example. Both may be sent in order to allow the receiver to choose the appropriate message. In one embodiment, an RTP packet may combine two "tone" and one "telephone-event" payloads. Two event payload formats known as the RTP Payload for Redundant Audio Data may be sent for different event types. The payload types may be chosen arbitrarily as 97 and 98, respectively, with a sample rate of 8000 Hz. For example, the redundancy format may have the dynamic payload type 96.

In one example, gateway 106 may send both the named event and partial characteristics of the tone in a packet at the instant that an event is declared. For example, with an ANSam signal, after gateway 106 detects the 2100 Hz tone, gateway 106 sends a packet indicative of such, and after gateway 106 detects the 15 Hz modulation tone, gateway 106 sends a packet indicating both tones. In addition, after gateway 106 detects both characteristics of the signal, gateway 106 may then declare that an event has occurred, i.e., that the signal is an ANSam signal and then send a packet indicating the event. The event packet and the tone packet that indicates both tones may be combined into one packet. Alternatively, gateway 106 may send two data packets in parallel to indicate all partial characteristics and the event.

While exemplary embodiments have been described, persons of skill in the art will appreciate that variations may be made without departure from the scope and spirit of the invention. The true scope and spirit of the present invention is defined by the appended claims, which may be interpreted in light of the foregoing.

What is claimed is:

1. A method of communicating signals between a first and a second communication network endpoint through a communication network, the method comprising:

receiving an incoming signal at the first communication network endpoint;

examining the incoming signal to detect at least one partial characteristic of the incoming signal, the at least one partial characteristic being insufficient to fully define the incoming signal according to predefined signal types;

upon detection of the at least one partial characteristic of the incoming signal, generating and transmitting to the second communication network endpoint a message that identifies the at least one partial characteristic of the incoming signal; and further examining the incoming signal to detect additional partial characteristics.

2. The method of claim 1, wherein receiving the incoming signal comprises receiving a signal selected from the group consisting of a fax signal and a modem signal.

3. The method of claim 2, wherein receiving the fax signal comprises receiving a given signal selected from the group consisting of a calling tone (CNG) signal, an answer tone (CED) signal, and a high level data link (HDLC) flag signal.

4. The method of claim 2, wherein receiving the modem signal comprises receiving a given signal selected from the group consisting of an answer signal (ANS), an answer signal with a phase reversal ($\overline{\text{ANS}}$), an answer signal with amplitude modulation (ANSam), and an answer signal with amplitude modulation and a phase reversal ($\overline{\text{ANSam}}$).

5. The method of claim 4, wherein examining the incoming signal comprises detecting characteristics selected from the group consisting of a 2100 Hz tone, a 180 degree phase reversal, and a 15 Hz amplitude modulation.

6. The method of claim 1, wherein examining the incoming signal comprises examining the incoming signal over a given time frame interval that is less than a minimum time duration required to unambiguously define the incoming signal.

7. The method of claim 1, wherein examining the incoming signal comprises detecting characteristics selected from the group consisting of a frequency of the incoming signal, a phase change of the incoming signal, and a modulation frequency of the incoming signal.

8. The method of claim 1, wherein upon detection of an additional partial characteristic of the signal, the method further comprises generating a second message identifying the at least one partial characteristic and the additional partial characteristic of the incoming signal.

9. The method of claim 1, wherein the first communication network endpoint is a gateway and the message is formatted according to the Internet protocol.

10. The method of claim 1, wherein transmitting to the second communication network endpoint the message comprises sending incremental information indicative of the incoming signal from the first communication network endpoint through the communication network to the second communication network endpoint.

11. The method of claim 1, wherein further examining the incoming signal to detect the additional partial characteristics comprises examining the incoming signal until a predetermined set of characteristics has been detected, such that the predetermined set of characteristics are sufficient to fully define the incoming signal according to the predefined signal types.

12. The method of claim 1, wherein the message comprises fields selected from the group consisting of a modulation field, a frequency field, an event field, a volume field, a duration field, a timestamp field, and an end packet indicator.

13. A method of communicating an event between a first and a second communication network endpoint through a communication network, the event comprising a set of predetermined characteristics, the method comprising:

receiving a signal at the first communication network endpoint;

detecting a subset of the set of predetermined characteristics within the signal;

generating a message that identifies the subset of the set of predetermined characteristics;

sending the message from the first communication network endpoint to the second communication network endpoint by way of the communication network;

determining that the signal includes the set of predetermined characteristics;
generating an event message that includes information indicative of the event, the information comprising an event identifier; and
sending the event message from the first communication network to the second communication network endpoint by way of the communication network.

14. The method of claim 13, wherein generating the event message that includes information indicative of the event further comprises generating the event message to include information identifying each characteristic of the set of predetermined characteristics.

15. The method of claim 13, wherein generating the event message comprises assigning a decimal number to correspond to the event, the decimal number being the event identifier.

16. A method of communicating a first signal between a first and a second communication network endpoint through a communication network, the first signal comprising a set of predetermined characteristics, the method comprising:
at the second communication network endpoint receiving a message from the first communication network endpoint, the message identifying a subset of the set of predetermined characteristics;
at the second communication network endpoint producing a second signal that has the subset of the set of predetermined characteristics, the second signal being different from the first signal;
at the second communication network endpoint receiving an event message from the first communication network endpoint, the event message identifying the set of predetermined characteristics and containing a signal identifier; and
at the second communication network endpoint producing a third signal that has the set of predetermined characteristics, the third signal being equivalent to the first signal.

17. The method of claim 16, wherein the subset of the set of predetermined characteristics is insufficient to fully define the first signal.

18. The method of claim 16, wherein the subset of the set of predetermined characteristics identifies at least one partial characteristic of the first signal.

19. A gateway coupled to a communication network, the gateway comprising:
a signal detector operable to receive a signal and to detect at least one partial characteristic of the signal, the at least one partial characteristic being insufficient to fully define the signal according to predefined signal types, the signal detector further operable to determine if the signal includes a set of predetermined characteristics that is indicative of an event;
a tone encoder coupled to the signal detector and operable to receive the at least one partial characteristic, to generate a first message that identifies the at least one partial characteristic of the signal, to transmit the first message on the communication network, to generate subsequent messages in response to the signal detector detecting additional partial characteristics of the signal, and to transmit the subsequent messages on the communication network, wherein the subsequent messages at least identify the at least one partial characteristic and the additional partial characteristics of the signal; and
an event encoder coupled to the signal detector and operable to generate an event message in response to the signal detector determining that the signal is indicative of the event, and to transmit the event message on the communication network.

20. The gateway of claim 19, further comprising:
a tone decoder operable to receive a given message that includes partial characteristics of a given signal and to identify the partial characteristics;
a tone generator coupled to the tone decoder and operable to receive the partial characteristics from the tone decoder and to generate a given signal that has the partial characteristics; and
an event decoder operable to receive a given event message and to determine what event has occurred.

21. The gateway of claim 19, wherein the signal detector determines that the signal is indicative of the event if the at least one partial characteristic and the additional partial characteristics of the signal comprise the set of predetermined characteristics.

22. The gateway of claim 19, wherein the signal detector continuously examines the signal to detect partial characteristics of the signal until the signal detector determines that the signal is indicative of the event.

23. A system comprising:
a communication network;
a first gateway coupled to the communication network, the first gateway operable to receive a first signal, to detect partial characteristics of the first signal, and to generate and send on the communication network a message that identifies at least one partial characteristic of the first signal, the first gateway further operable to determine if the first signal is indicative of an event and if so, to send an event message indicative of the event; and
a second gateway coupled to the communication network, the second gateway operable to receive the message from the first gateway through the communication network and to produce a second signal having the at least one partial characteristic of the first signal, the second gateway further operable to receive the event message and to determine a state of the first gateway based on the event message.

24. The system of claim 23, wherein the first gateway generates a new message in response to detecting another partial characteristic of the first signal.

25. The system of claim 24, wherein the first gateway sends the new message through the communication network to the second gateway.

26. The system of claim 23, wherein the message comprises fields selected from the group consisting of a modulation field, a frequency field, an event field, a volume field, a duration field, a timestamp field, and an end packet indicator.

27. The system of claim 23, wherein the state of the first gateway indicates a type of a call established between the first gateway and the second gateway.

* * * * *